(12) United States Patent
Saifuddin et al.

(10) Patent No.: US 7,753,815 B2
(45) Date of Patent: Jul. 13, 2010

(54) BICYCLE CHAIN WHEEL ASSEMBLY

(75) Inventors: Muhd Àdi Saifuddin, Bukit Meringin (MY); Noor Adian Bin Mohsin, Batu Pahat (MY); Masahiro Hanatani, Spanish Village (SG)

(73) Assignee: Shimano Components (Malaysia) Sdn. Bhd., Pontian Johor (MY)

( * ) Notice: Subject to any disclaimer, the term of this patent is extended or adjusted under 35 U.S.C. 154(b) by 309 days.

(21) Appl. No.: 11/655,067

(22) Filed: Jan. 19, 2007

(65) Prior Publication Data

US 2008/0176691 A1    Jul. 24, 2008

(51) Int. Cl.
*F16H 55/30* (2006.01)
*F16H 57/02* (2006.01)

(52) U.S. Cl. ............ 474/160; 474/140; 474/144; 474/151; 474/152; 74/594.2; 74/609; 301/37.31

(58) Field of Classification Search .......... 474/160, 474/140, 144, 151, 273; D12/123–127; 74/594.2, 74/551.8, 551.9, 594.1, 609; 301/37, 37.31, 301/37.41; F16H 57/30
See application file for complete search history.

(56) References Cited

U.S. PATENT DOCUMENTS

| | | | | |
|---|---|---|---|---|
| 5,003,840 A | * | 4/1991 | Hinschlager | 74/594.2 |
| 5,273,495 A | * | 12/1993 | Nagano | 474/144 |
| 5,320,583 A | * | 6/1994 | van Wingen born Looyen | 474/144 |
| 5,876,296 A | * | 3/1999 | Hsu et al. | 474/160 |
| 6,450,909 B1 | * | 9/2002 | Yamanaka | 474/160 |
| 2001/0033103 A1 | * | 10/2001 | Nunes et al. | 301/37.31 |

FOREIGN PATENT DOCUMENTS

| | | |
|---|---|---|
| JP | S56-139692 | 10/1981 |
| JP | S59-104890 | 7/1984 |

* cited by examiner

*Primary Examiner*—Robert A Siconolfi
*Assistant Examiner*—San Aung
(74) *Attorney, Agent, or Firm*—Global IP Counselors, LLP

(57) ABSTRACT

A bicycle chain wheel assembly is provided with a chain wheel and a chain wheel cover. The chain wheel has a central mounting portion and an outer gear with a plurality of outer gear teeth. The chain wheel cover is disposed on an exteriorly facing side of the chain wheel. The chain wheel cover has a mounting portion coupled to the chain wheel and an outer peripheral portion with a chain drop prevention protrusion projecting outwardly from the outer peripheral portion at a location that is radially inward of the outer gear teeth.

16 Claims, 8 Drawing Sheets

BICYCLE CHAIN WHEEL ASSEMBLY

BACKGROUND OF THE INVENTION

1. Field of the Invention

The present invention generally relates to a bicycle chain wheel having a chain drop prevention feature. More specifically, the present invention relates to a bicycle chain wheel with a chain drop prevention feature that prevent the chain dropping off of the large sprocket or gear to the outside of the large sprocket or gear.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle to make the bicycle easier to assemble and more affordable to purchase and maintain.

One particular portion of a bicycle that has been extensively redesigned over the past years is the drive train of the bicycle. A bicycle drive train typically has a chain that interconnects one or more front gears (chainrings) to one or more sprockets mounted on the rear wheel. The front gears are mounted on the bicycle frame by a bottom bracket that has a crank arm axle that rotates relative to the bicycle frame. Each end of the crank arm axle has a crank arm fixed thereto for rotating the crank arm axle relative to the bicycle frame. The crank arms extend outwardly from the bottom bracket in opposite directions and have pedals attached to their free ends for supporting the rider's feet. The front gears are typically attached to the right crank arm to rotate therewith. Rotation of the pedals by the rider causes the chain wheels to rotate which in turn moves the bicycle chain to rotate the rear sprockets, and thus, rotate the rear wheel of the bicycle.

With a bicycle having a chain wheel such as described above, a front shift control device and a front derailleur, which are typically linked by a shift cable, are used to move the chain between the front gears. In particular, the front derailleur is operated by the shift cable upon actuation of the front shift control device such that the chain is guided or shifted onto the desired front sprocket of the plurality of front sprockets. However, sometimes the chain can drop off from the outer gear and fall between the right crank arm and the outer gear. To avoid the chain from becoming jammed between the right crank arm and the outer gear, the outer gear is sometimes provided with a chain drop prevention pin that extends outwardly from the outer gear towards the right crank arm. While these conventional front chain wheels generally function well with this type of chain drop prevention pin. They do suffer from some deficiencies. In particular, with the above-mentioned conventional front chain wheels, the chain drop prevention pin may be damaged, which would require the entire outer gear to be replaced. Moreover, adding the chain drop prevention pin to the outer gear increases the overall cost of manufacturing the outer chain wheel.

In view of the above, it will be apparent to those skilled in the art from this disclosure that there exists a need for an improved bicycle chain wheel assembly. This invention addresses this need in the art as well as other needs, which will become apparent to those skilled in the art from this disclosure.

SUMMARY OF THE INVENTION

One object of the present invention is to provide a bicycle chain wheel assembly which prevents the chain from becoming lodged in a gap between the outer gear and the right crank arm in the event that the chain falls off the outer gear during riding.

Another object of the present invention is to provide a bicycle chain wheel assembly that is relatively lightweight.

Yet another object of the present invention is to provide a bicycle crankset that is relatively simple and inexpensive to manufacture and assemble.

The foregoing objects can basically be attained by providing a bicycle chain wheel assembly in accordance with a first aspect of the present invention that comprises a chain wheel and a chain wheel cover. The chain wheel includes a central mounting portion and an outer gear with a plurality of outer gear teeth. The chain wheel cover is disposed on an exteriorly facing side of the chain wheel. The chain wheel cover includes a mounting portion coupled to the chain wheel and an outer peripheral portion with a chain drop prevention protrusion projecting outwardly from the outer peripheral portion at a location that is radially inward of the outer gear teeth.

In accordance with a second aspect of the present invention, a bicycle chain wheel cover basically comprises a mounting portion and a ring-shaped outer peripheral portion with a chain drop prevention protrusion. The mounting portion is configured to be coupled to a chain wheel. The chain drop prevention protrusion projects outwardly from the outer peripheral portion adjacent an outer peripheral edge.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
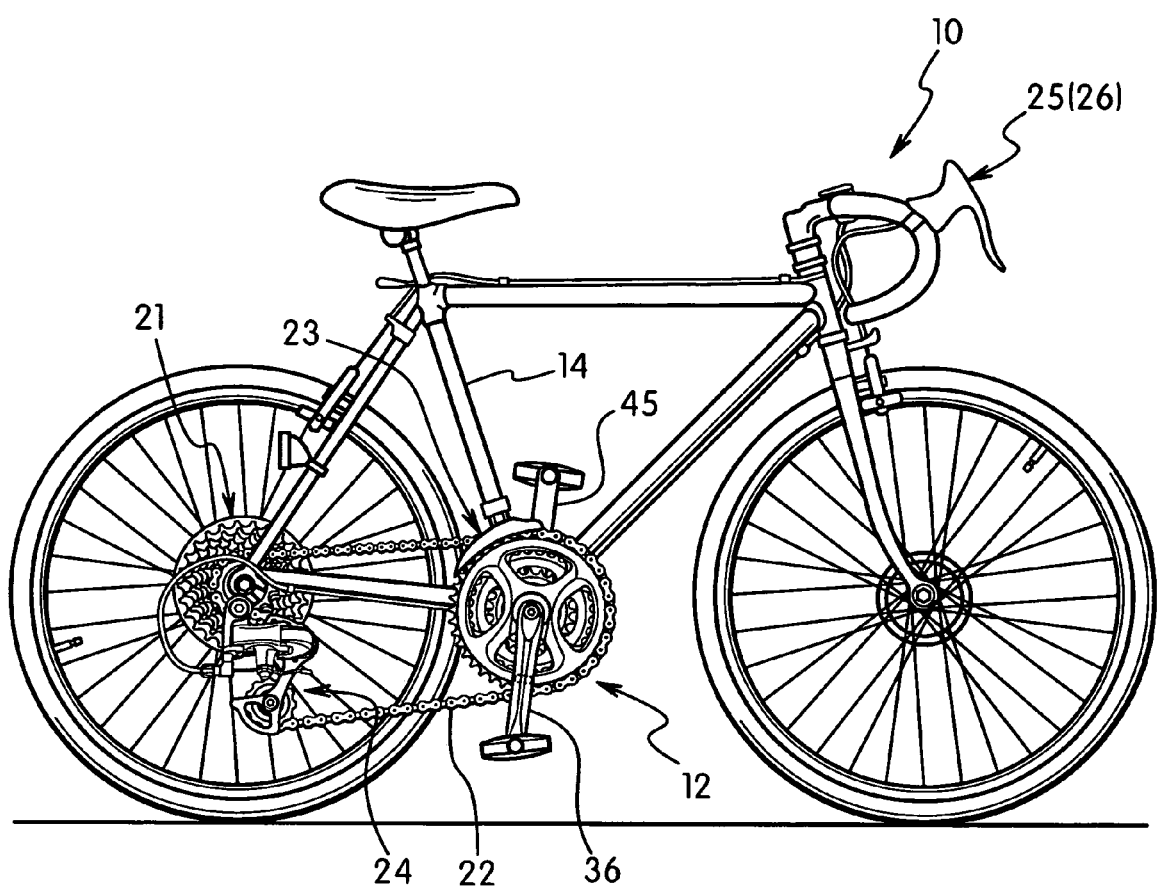
FIG. 1 is a side view of a bicycle equipped with a bicycle chain wheel assembly in accordance with one preferred embodiment of the present invention.

Referring initially to FIG. 1, a bicycle 10 is illustrated that is equipped with a bicycle chain wheel assembly 12 in accordance with one embodiment of the present invention. Since the bicycle chain wheel assembly 12 relates to a bicycle drive train, the parts of the bicycle drive train will be briefly discussed. The other parts of the bicycle 10 are conventional, and thus, will not be discussed and/or illustrated in detail herein.

The bicycle chain wheel assembly 12 is mounted to a bicycle frame 14 in a conventional manner. In addition to the bicycle chain wheel assembly 12, the bicycle drive train basically includes a rear cassette or sprocket assembly 21, a chain 22, a front derailleur 23 and a rear derailleur 24. The chain 22 is shifted by a rider selectively operating a pair of shift operating devices 25 and 26 in a conventional manner to actuate the derailleurs 23 and 24. The bicycle chain wheel assembly 12 is rotatably mounted to a hanger tube located at a lower part of the frame 14, while the rear cassette 21 is rotatably mounted to a pair of seat stays the frame 14.

Figure 2:
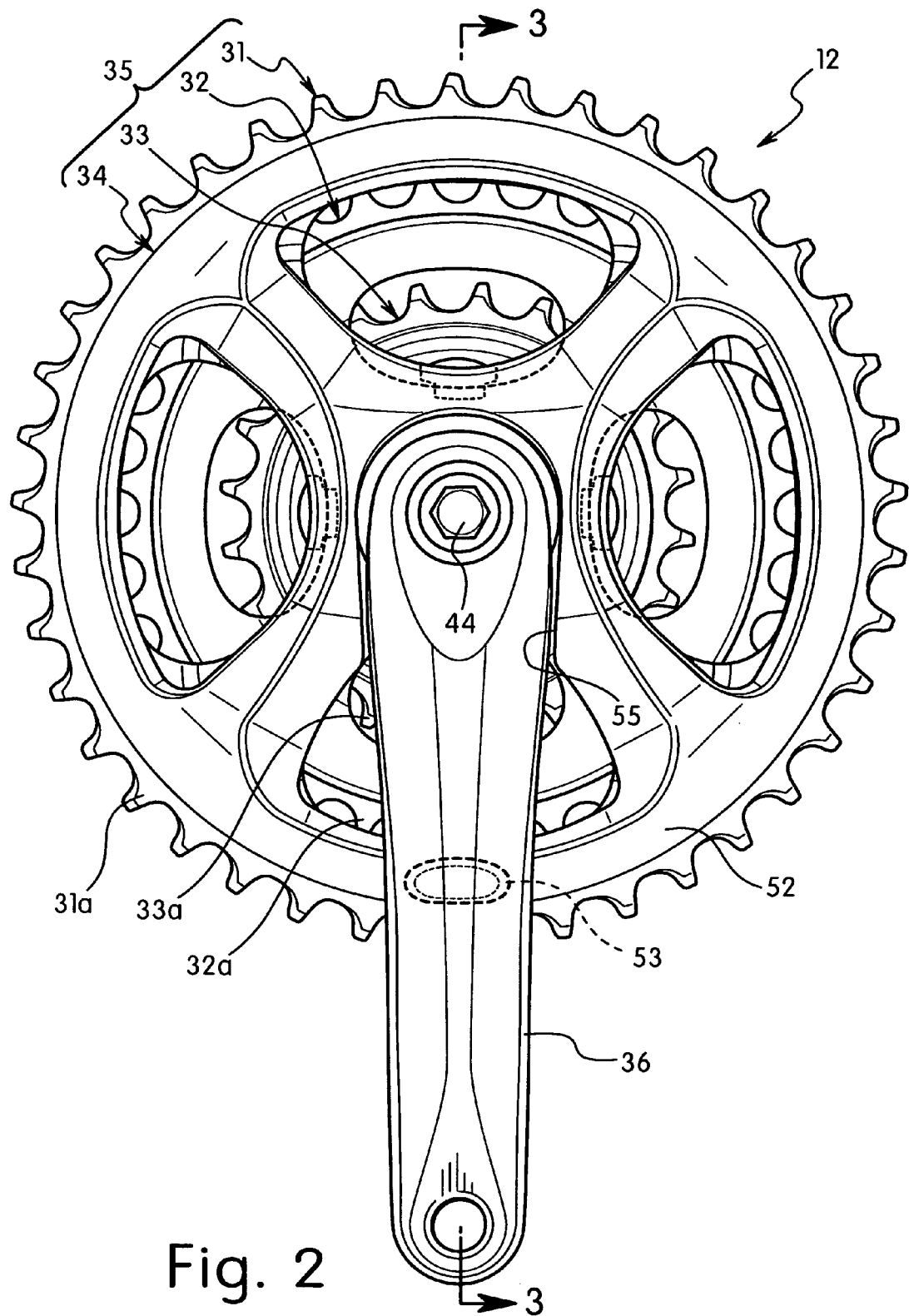
FIG. 2 is an outside elevational view of a crank set with the bicycle chain wheel assembly illustrated in FIG. 1 in accordance with the present invention.
Figure 3:
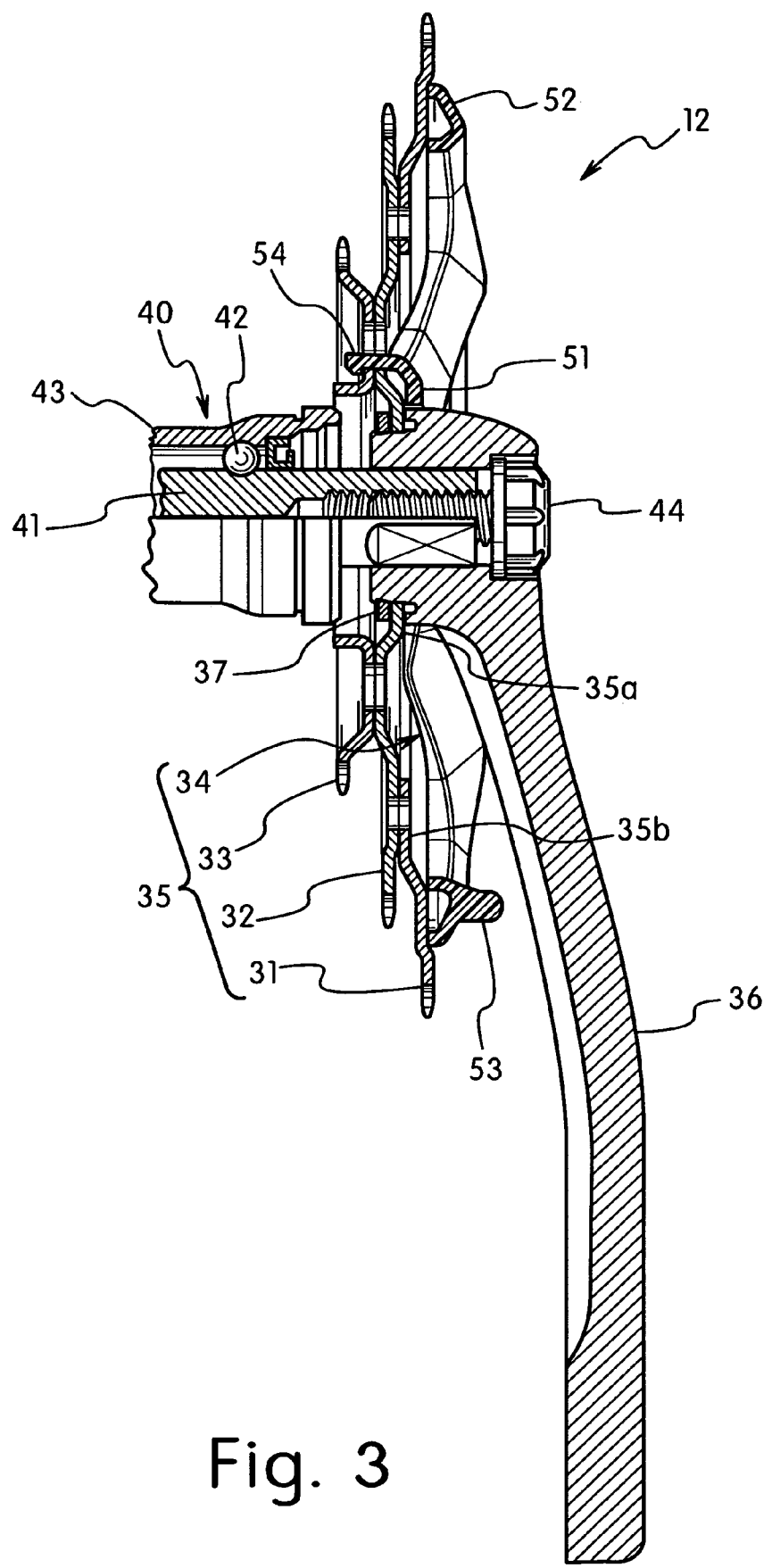
FIG. 3 is a cross sectional view of the crank set illustrated in FIGS. 1 and 2 as seen along section line 3-3 of FIG. 2, with selected portions shown in elevation.
Figure 4:
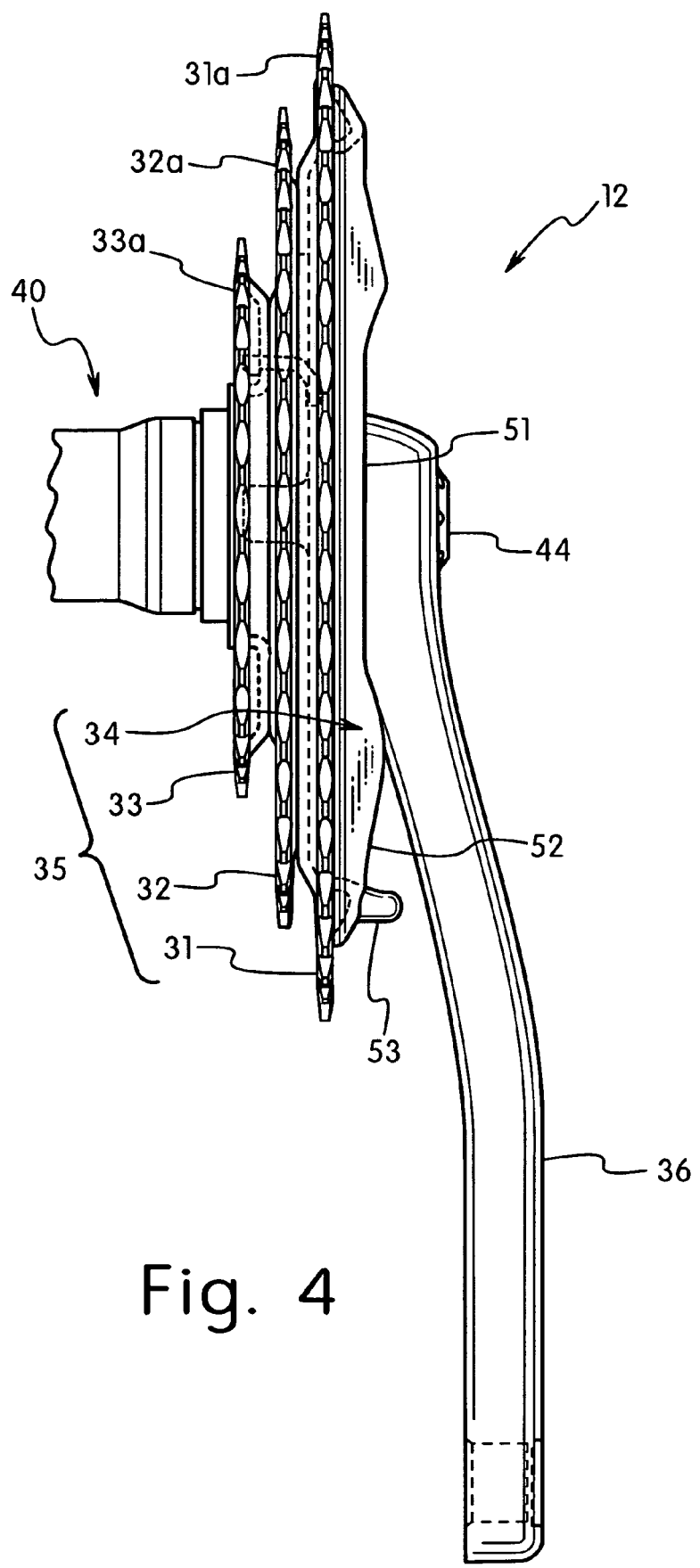
FIG. 4 is a rear elevational view of the crank set with the bicycle chain wheel assembly illustrated in FIGS. 1-3 in accordance with the present invention.
Figure 5:
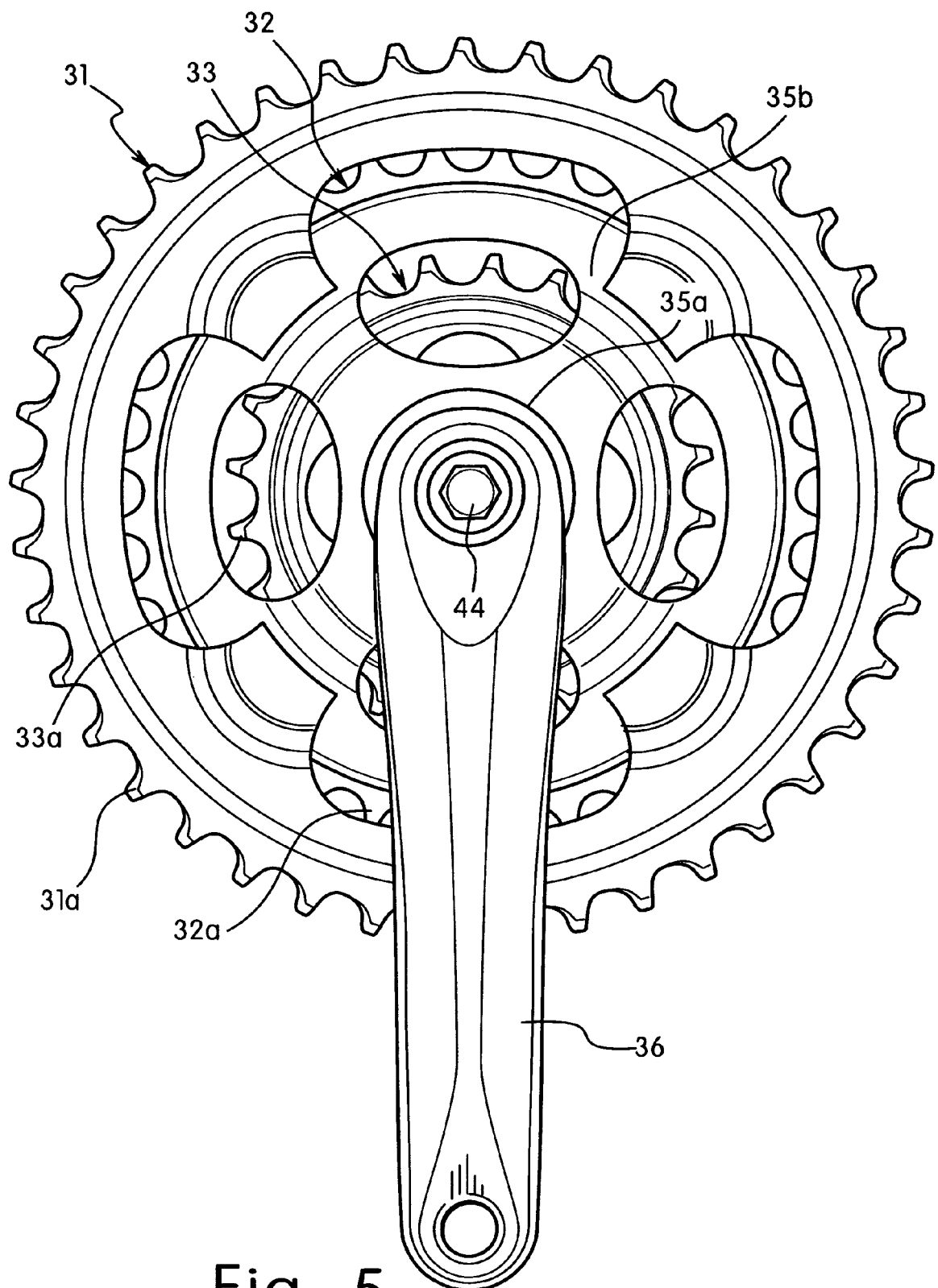
FIG. 5 is an outside elevational view of the crank set with the bicycle chain wheel cover removed.
Figure 6:
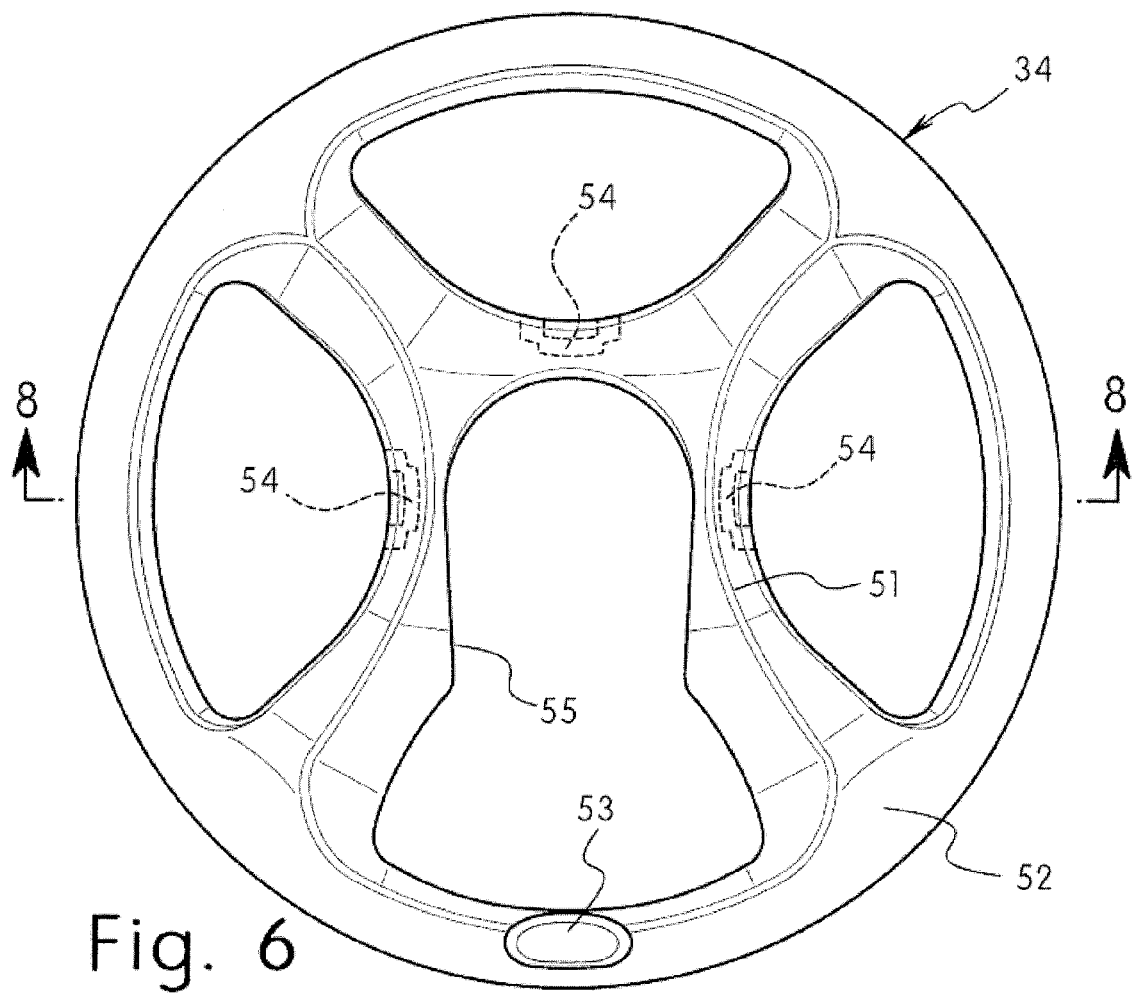
FIG. 6 is an outside elevational view of the bicycle chain wheel cover illustrated in FIGS. 1-5 in accordance with the present invention.
Figure 7:
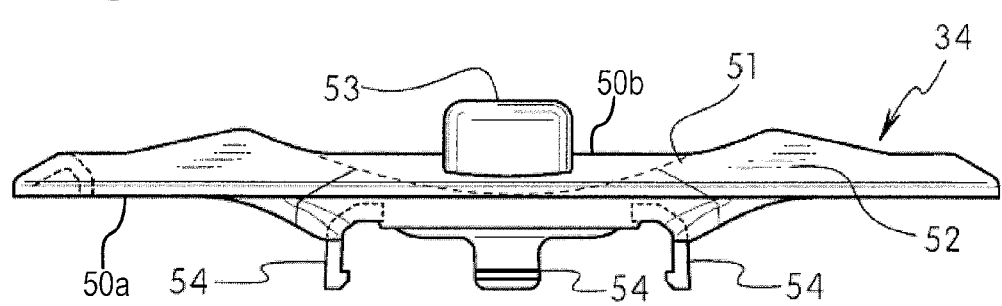
FIG. 7 is a bottom plan view of the bicycle chain wheel cover illustrated in FIG. 6 in accordance with the present invention.
Figure 8:
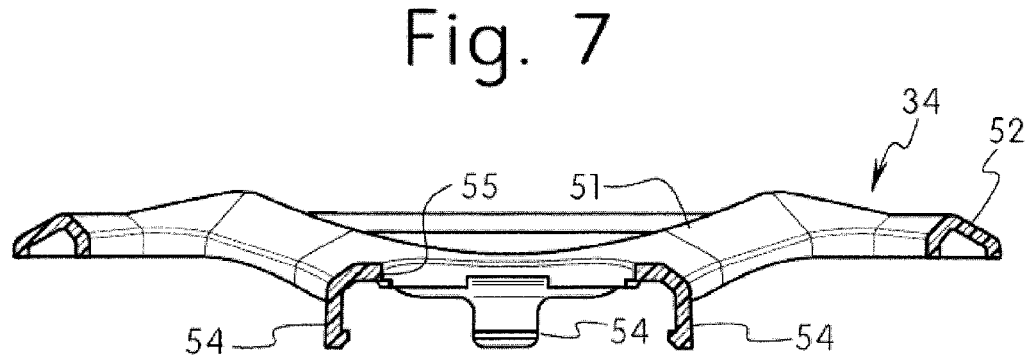
FIG. 8 is a cross sectional view of the bicycle chain wheel cover as seen along section line 8-8 of FIG. 6.
Figure 9:
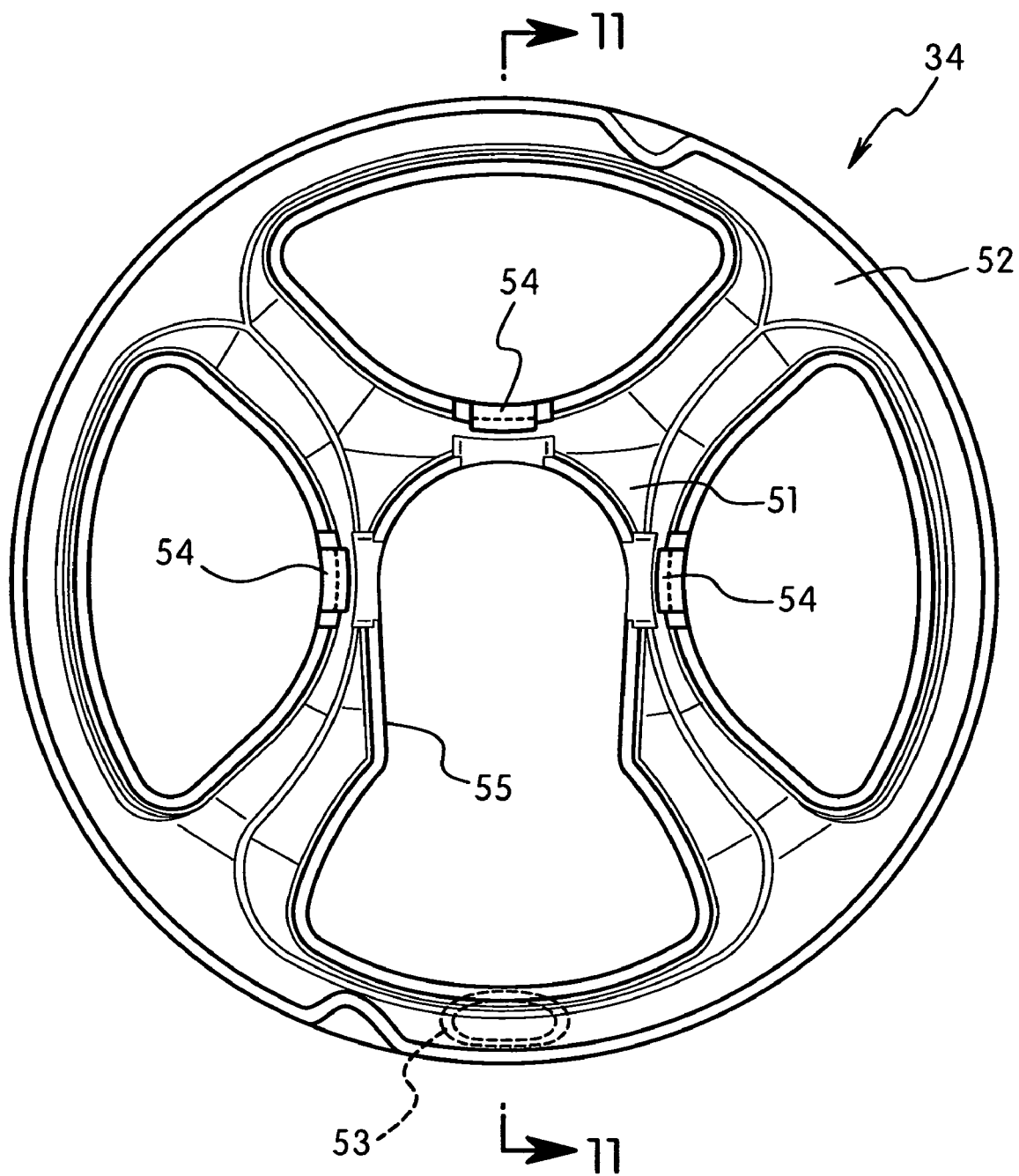
FIG. 9 is an inside elevational view of the bicycle chain wheel cover illustrated in FIGS. 6-8 in accordance with the present invention.
Figure 10:
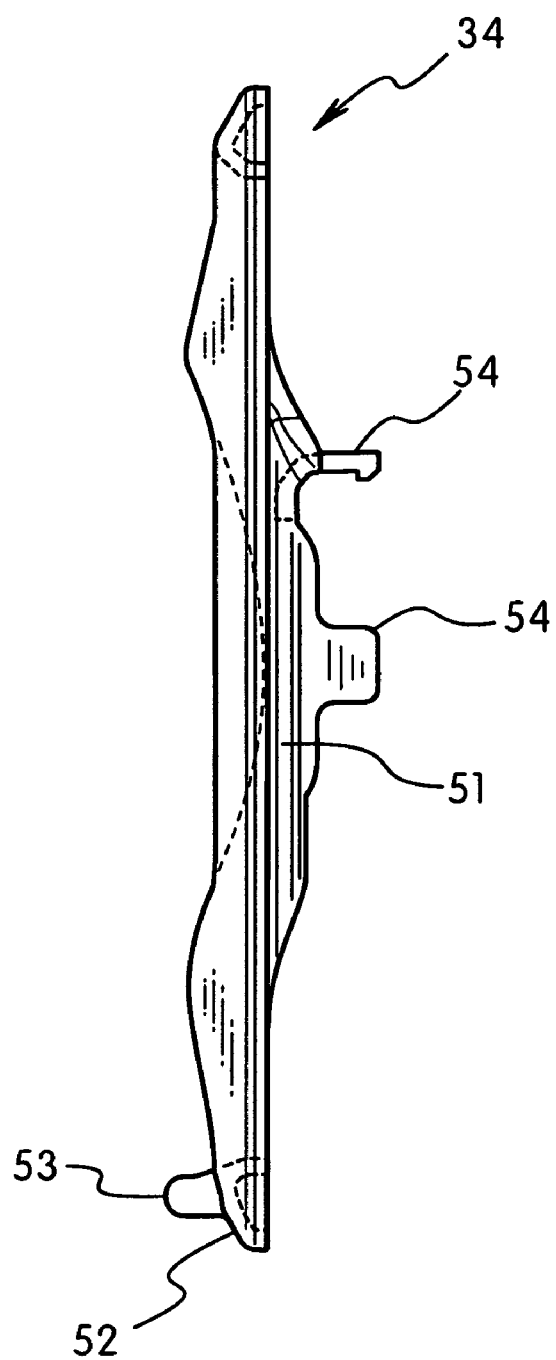
FIG. 10 is a rear elevational view of the bicycle chain wheel cover illustrated in FIGS. 6-9 in accordance with the present invention.
Figure 11:
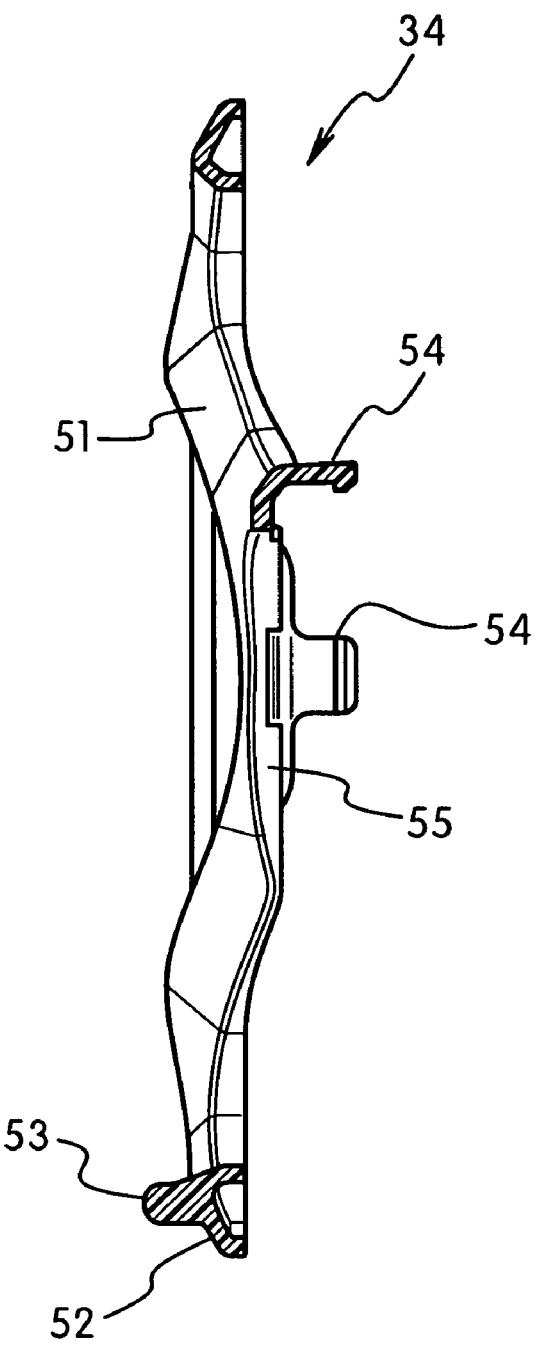
FIG. 11 is a cross sectional view of the bicycle chain wheel cover as seen along section line 11-11 of FIG. 9.

As best seen in FIGS. 2 and 3, the bicycle chain wheel assembly 12 basically includes an outer gear 31, a middle gear 32, an inner gear 33 and a ring-shaped chain wheel cover 34. The gears 31 to 33 are fixedly coupled together to from a chain wheel 35. The chain wheel cover 34 is disposed on an exteriorly facing side of the chain wheel 35 to overlie the exterior face of the outer gear 31.

As seen in FIG. 3, the bicycle chain wheel assembly 12 is fixedly secured on a right crank arm 36 by a locking ring 37, and the right crank arm 36 is mounted to a bottom bracket 40. The bottom bracket 40 is a conventional structure that basically includes a crank axle 41, a pair of bearings 42 (only one shown) and a tubular fixing member 43. A fixing bolt 44 mounts the right crank arm 36 and the bicycle chain wheel assembly 12 to the crank axle 41 of the bottom bracket 40 to rotate therewith. A left crank arm 45 is mounted to the other end of the crank axle 41 in a conventional manner.

Each of the gears 31 to 33 are made of a rigid metallic material (e.g. aluminum alloy, titanium, steel or the like) as a one-piece, unitary member. In the illustrated embodiment, the gears 31 to 33 are stamped from a sheet metal material with the outer and inner gears 31 and 33 being spot welded to the middle gear 32. Of course, it will be apparent from this disclosure that other types of fastening arrangements can be used such as bolts. The gears 31 to 33 are lined up in consecutive order in the axial direction so that the number of teeth on decreases in the axial direction towards the bicycle frame 14 (i.e. each subsequent inwardly located gear has a smaller diameter). In particular, the gears 31 to 33 have a plurality of outer, middle and inner gear teeth 31a, 32a and 33a, respectively, with each subsequent inwardly located gear having fewer circumferentially spaced gear teeth 31a, 32a and 33a, respectively. The outer gear 31 is a large-diameter sprocket with, about forty-two teeth (42T for example), and is disposed the farthest outward in the axial direction. The middle gear 32 is a medium-diameter sprocket with about thirty-four teeth (34T for example), and is disposed at an intermediate position in the axial direction. The inner gear 33 is a small-diameter sprocket with, about twenty-four teeth (24T for example), and is disposed the farthest inward in the axial direction. Since the gears 31 to 33 are well known in the art, these structures will not be discussed or illustrated in detail herein.

In the illustrated embodiment, the chain wheel 35 has a central mounting portion 35a that is formed by a central part of the middle gear 32. The mounting portion 35a is secured in a non-rotatable manner to the right crank arm 36. For example, the central mounting portion 35a has internal threads that engage external threads on the right crank arm 36. The locking ring 37 is installed on the external threads of the right crank arm 36 to prevent the chain wheel 35 from unthreading from the right crank arm 36. Of course, it will be apparent from this disclosure that other mounting arrangements are possible. The middle gear 32 of the chain wheel 35 further includes a spider portion 35b supporting the outer gear 31 and the inner gear 33.

As best seen in FIGS. 6 to 11, the chain wheel cover 34 includes a first axial side 50a (FIGS. 7 and 8 only) and a second axial side 50b (FIGS. 7 and 8 only), a mounting portion 51 and an outer peripheral portion 52. The mounting portion 51 is coupled to the chain wheel 35 (i.e., the central part of the middle gear 32). The outer peripheral portion 52 includes a chain drop prevention protrusion 53 projecting outwardly from the outer peripheral portion 52 at a location that is radially inward of the outer gear teeth 31a. The chain drop prevention protrusion 53 extends from the second axial side 50b, and as shown in FIG. 3, the chain drop prevention protrusion 53 extends away from the gears 31, 32 and 33. The mounting portion 51, the outer peripheral portion 52 and the chain drop prevention protrusion 53 are integrally formed as a one-piece, unitary member. Preferably, the chain wheel cover 34 is constructed from a non-metallic material such as a synthetic resin material that is relatively hard (e.g., polyacetal, polypropylene, or polyamide resin). The synthetic resin material of the chain wheel cover 34 also preferably has a lower weight (i.e. per unit of volume) than the metal material of the chain wheel 35.

The mounting portion 51 of the chain wheel cover 34 also includes three clips 54 and a cutout 55 for receiving the right crank arm 36. The clips 54 are configured and arranged to couple the chain wheel cover 34 to the chain wheel 35 via a snap fit type of arrangement. The clips 54 form a releasable and reinstallable connection such that the chain wheel cover 34 can be easily removed and reinstalled without any tools. Thus, the clips 54 hare configured and arranged to be resilient enough to remove and reinstall the chain wheel cover 34 to the chain wheel 35 without breaking the clips 54.

The clips 54 extend from the inner side of the chain wheel cover 34 in an axial direction to engage openings in the central part of the middle gear 32. Thus, the clips 54 are latching protrusions having a hook shape, that are elastically latched to the central part of the middle gear 32. In particular, during installation, the distal ends of the clips 54 are bent slightly toward the outer side of the chain wheel cover 34. More specifically, when the chain wheel cover 34 is mounted to the chain wheel 35, the chain wheel cover 34 is pushed axially toward to the chain wheel 35 such that the clips 54 deform and then hook onto the central part of the middle gear 32 to provide a snug elastic latch to the chain wheel 35. When the distal ends of the clips 54 are bent slightly outwardly relative to the center of the chain wheel cover 34, the gap between clips 54 widened, and then subsequently narrowed.

The chain drop prevention protrusion 53 of the chain wheel cover 34 is provided in order to prevent the chain 22 from moving radially into the gap between the outer gear 31 and the right crank arm 36. Because, the chain drop prevention protrusion 53 is part of the chain wheel cover 34, the manufacturing costs of the chain wheel 35 can be reduced in comparison to a chain wheel having a metal pin formed on its outer gear. Moreover, if the chain drop prevention protrusion 53 should happen to be damaged, than the chain wheel cover 34 can be replaced rather than the more expensive chain wheel.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention. Finally, terms of degree such as "substantially", "about" and "approximately" as used herein mean a reasonable amount of deviation of the modified term such that the end result is not significantly changed.

While only one embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle chain wheel assembly comprising:
   a chain wheel including a central mounting portion and an outer gear with a plurality of outer gear teeth;
   a crank arm extending from a central portion of the chain wheel; and
   a chain wheel cover having a first axial side and a second axial side, the chain wheel cover being disposed on an exteriorly facing side of the chain wheel with the first axial side facing the chain wheel, the chain wheel cover including a mounting portion coupled to the chain wheel and an outer peripheral portion with a chain drop prevention protrusion projecting outwardly from the outer peripheral portion in a direction away from the second axial side and away from the chain wheel at a location that is radially inward of the outer gear teeth, the chain drop prevention protrusion being located between the chain wheel and the crank arm.

2. The bicycle chain wheel assembly according to claim 1, wherein
   the mounting portion, the outer peripheral portion and the chain drop prevention protrusion are integrally formed as a one-piece, unitary member.

3. The bicycle chain wheel assembly according to claim 2, wherein
   the chain wheel cover is formed of a non-metallic material.

4. The bicycle chain wheel assembly according to claim 1, wherein
   the mounting portion of the chain wheel cover includes at least one clip to couple the chain wheel cover to the chain wheel with a releasable and reinstallable connection.

5. The bicycle chain wheel assembly according to claim 1, wherein
   the mounting portion of the chain wheel cover includes a cutout for receiving the crank arm.

6. The bicycle chain wheel assembly according to claim 1, wherein
   the chain wheel further includes an inner gear with a plurality of inner gear teeth defining an outer diameter that is smaller than an outer diameter of the outer gear as defined by the outer gear teeth.

7. The bicycle chain wheel assembly according to claim 6, wherein
   the chain wheel further includes a spider portion supporting the outer gear and the inner gear.

8. The bicycle chain wheel assembly according to claim 7, wherein
   the mounting portion of the chain wheel cover is couple to the chain wheel by a releasable and reinstallable connection.

9. The bicycle chain wheel assembly according to claim 8, wherein
   the mounting portion of the chain wheel cover includes at least one clip to couple the chain wheel cover to the chain wheel with the releasable and reinstallable connection.

10. The bicycle chain wheel assembly according to claim 1, wherein
    the chain wheel cover is constructed of a material with a lower weight per unit area than the chain wheel.

11. A bicycle chain wheel cover having a first axial side and a second axial side opposite the first axial side, the bicycle chain wheel cover comprising:
    a mounting portion at the first axial side of the chain wheel cover configured to be coupled to a chain wheel; and
    an outer peripheral portion with a chain drop prevention protrusion projecting outwardly from the outer peripheral portion in a direction away from the second axial side and away from the chain wheel at a location adjacent an outer peripheral edge, the chain wheel cover including a cutout that extends between the mounting portion and the outer peripheral portion for receiving a crank arm such that the chain drop prevention protrusion is located between the crank arm and the chain wheel.

12. The bicycle chain wheel cover according to claim 11, wherein
    the mounting portion, the outer peripheral portion and the chain drop prevention protrusion are integrally formed as a one-piece, unitary member.

13. The bicycle chain wheel cover according to claim 12, wherein
    the chain wheel cover is formed of a non-metallic material.

14. The bicycle chain wheel cover according to claim 11, wherein the mounting portion of the chain wheel cover includes at least one clip to couple the chain wheel cover to the chain wheel with a releasable and reinstallable connection.

15. The bicycle chain wheel cover according to claim 11, wherein
the cutout of the mounting portion being aligned in a radial direction between a center rotational axis of the chain wheel cover and the chain drop prevention protrusion.

16. The bicycle chain wheel assembly according to claim 1, wherein
the crank arm is mounted on the chain wheel in a non-rotateable manner with the chain drop prevention protrusion being aligned with the crank arm as viewed along a center rotational axis of the chain wheel.

* * * * *